US009036654B2

(12) United States Patent
Wisehart

(10) Patent No.: US 9,036,654 B2
(45) Date of Patent: May 19, 2015

(54) PACKET SHARING DATA TRANSMISSION SYSTEM AND RELAY TO LOWER LATENCY

(71) Applicant: SMG HOLDINGS—ANOVA TECHNOLOGIES, LLC, Chicago, IL (US)

(72) Inventor: Daniel J. Wisehart, Mission Viejo, CA (US)

(73) Assignee: SMG Holdings—Anova Technologies, LLC, Chicago, IL (US)

( * ) Notice: Subject to any disclaimer, the term of this patent is extended or adjusted under 35 U.S.C. 154(b) by 0 days.

(21) Appl. No.: 14/484,602

(22) Filed: Sep. 12, 2014

(65) Prior Publication Data
US 2015/0078376 A1 Mar. 19, 2015

Related U.S. Application Data

(60) Provisional application No. 61/877,385, filed on Sep. 13, 2013.

(51) Int. Cl.
H04J 3/16 (2006.01)
H04L 12/721 (2013.01)
H04L 12/54 (2013.01)
H04L 12/931 (2013.01)

(52) U.S. Cl.
CPC . *H04L 45/44* (2013.01); *H04J 3/16* (2013.01); *H04L 12/5695* (2013.01); *H04L 49/351* (2013.01)

(58) Field of Classification Search
USPC ......... 370/235, 335, 336, 342, 347, 412, 429, 370/468
See application file for complete search history.

(56) References Cited

U.S. PATENT DOCUMENTS

| 6,118,787 | A | 9/2000 | Kalkunte et al. | |
|---|---|---|---|---|
| 6,952,401 | B1 * | 10/2005 | Kadambi et al. | 370/232 |
| 7,028,281 | B1 * | 4/2006 | Agrawal et al. | 326/41 |
| 7,209,442 | B1 | 4/2007 | Chapman | |
| 7,283,747 | B2 | 10/2007 | Schofield et al. | |
| 7,339,923 | B2 | 3/2008 | Rogers | |
| 7,366,208 | B2 | 4/2008 | Bowes | |
| 7,720,094 | B2 | 5/2010 | Turner et al. | |
| 7,969,886 | B1 * | 6/2011 | Hoichman | 370/235 |
| 8,027,289 | B2 | 9/2011 | Ramanathan et al. | |
| 8,478,896 | B2 | 7/2013 | Ehlers | |
| 8,490,110 | B2 | 7/2013 | Hoover et al. | |
| 2003/0099139 | A1 * | 5/2003 | Abrosimov et al. | 365/200 |

(Continued)

FOREIGN PATENT DOCUMENTS

WO  WO2012139653  10/2012

*Primary Examiner* — Phuongchau Ba Nguyen
(74) *Attorney, Agent, or Firm* — Loeb & Loeb LLP

(57) ABSTRACT

The system is for combining and transmitting data fragments for multiple customer ports sent over a first packet-switched computer network to a trunk network and redistributed over a second packet-switched computer network, each customer port having a preselected bandwidth designation. The system provides a First-In First-Out (FIFO) register to capture incoming data bits from each customer port in parallel and speeds equal to or greater than 1 Gbps, providing selectors connected to the FIFO outputs. Each selector is capable of mapping individual incoming data bits from different customer ports and combining them into the same trunk fragments. Each trunk fragment receives data bits from customer ports. by selector values for each customer. The filling sequence for each fragment is repeated until sufficient trunk fragments form a filled trunk frame.

30 Claims, 9 Drawing Sheets

(56) References Cited

U.S. PATENT DOCUMENTS

| | | |
|---|---|---|
| 2005/0165968 A1 | 7/2005 | Natarajan |
| 2007/0086392 A1 | 4/2007 | Sinnarajah et al. |
| 2007/0094474 A1* | 4/2007 | Wilson et al. .............. 711/206 |
| 2007/0147238 A1 | 6/2007 | Kadambi |
| 2007/0171902 A1 | 7/2007 | Simonsson |
| 2007/0255855 A1 | 11/2007 | Knapp et al. |
| 2008/0069125 A1 | 3/2008 | Reed |
| 2009/0196303 A1 | 8/2009 | Battle |
| 2010/0191856 A1 | 7/2010 | Gupta et al. |
| 2010/0205501 A1 | 8/2010 | Tzannes |
| 2010/0284692 A1 | 11/2010 | Szell et al. |
| 2011/0153820 A1 | 6/2011 | Atkinson |
| 2013/0129005 A1 | 5/2013 | Xia et al. |

* cited by examiner

Case {Start}

$d0\{ \quad b[63.0] \}$    Shift min (64,N)

$d1\{160, b[63.1]\}$ $d62\{6260, b[63.62]\}$ ; Shift min (2, N) ;

$d63\{6360, b[63]\}$ ; Shift 1 ;

$d64\{6460\}$,        Shift 0;

reduce 64 selectors per cust.
To 1 selector per cust.

Map

Each cust. 188 entries x 7-bit starting value
        256 x 8 = 2 kb
           x 64 cust. = 128 kb Sender    188 entries x 6-bit cust. X 64 bits
          188 x 384 = 71 kb
          Total = 199 kb

FIG. 6

PACKET SHARING DATA TRANSMISSION SYSTEM AND RELAY TO LOWER LATENCY

This application claims priority from U.S. Provisional Application No. 61/877,385 filed Sep. 13, 2013.

This application pertains to systems and methods for management, construction and control of data packets in order to lower latency of transmissions via and including radio frequency (RF), free space optics (FSO), (collectively "wireless") and/or fiber optics transmission media.

BACKGROUND

Ethernet and packet-switched Internet Protocol (IP) networks are systems for transmitting data between different points. These systems may be known as "point-to-point" or "contention-based" systems. In many circumstances all transmitters contend for network resources and all transmitters may transmit simultaneously. Due such transmission processes network resources may be oversubscribed, bottlenecks may occur or data may be delayed or lost, resulting in network impairment and high latency rates.

Conventional networks comprise a plurality of Local Area Network (LAN) endpoints, for example computers connected to an Ethernet LAN. Endpoints may be coupled to one or more LAN switches that connect to one or more additional LAN endpoints. If too many packets are simultaneously transmitted by other endpoints, the LAN switch may have a queue overflow, causing latency and/or packets to be lost. ("Packets" mean datagrams in a LAN or Wide Area Network (WAN) environment. In a LAN environment, packets are sometimes called "frames." In a packet-switched WAN environment, packet-switching devices are normally referred to as "routers").

Delivery protocols for resolving congestion and replacing dropped packets are well known, such as Transmission Control Protocol (TCP). But such solutions may be inappropriate for point-to-point environments and RF transmissions where latency below one microsecond is required, the round-trip propagation delay between stations is excessive and even the latency of waiting for another's single packet to be sent is excessive. Scheduling the transmission of packets by partitioning the packets into discrete frames and subframes is known in order to combat latency issues, but is insufficient in low latency systems. It is possible to schedule packets for delivery during time slots in the subframes corresponding to empirically determined conditions, but there can be a delay of a one to many subframes before data starts to flow for a given application. Based on the packet size and underlying network bandwidth, some varying fraction of each time slot would be actually used to transmit a packet. Assuming a packet size of 125 bytes (1,000 bits) and a port allocated 10 mbps, a single 100-microsecond time slot would be used to transmit each 125 byte packet. With a packet size of 1,500 bytes, twelve of the 100 microsecond intervals would be consumed by each packet transmission.

Configuration maps are known to provide a data structure indicating time slots that have already been allocated to other transmitters for reception by the receiving node (or, alternatively, time slots that have not yet been allocated, or, alternatively, time slots that are candidates for transmission). A reception map is a data structure that indicates time slots during which transmission to the intended receiving node would not conflict with other transmitters. Although there are many ways of representing such a map, one approach is to use a bitmap wherein each bit corresponds to one time slot, and a "1" indicates that the time slot has been allocated to a transmitting node, and a "0" indicates that the time slot has not yet been allocated. If a 1,232-nanosecond delivery interval were divided into 1 nanosecond time slots, there would be 1,232 bits in the reception map. What makes this approach unique is that instead of dividing port traffic on the basis of packets which can be 12,000 bits long or larger, this approach divides up and mixes traffic from different ports at the bit level, assuring port data moves through the system limited only by assigned bandwidth and not effected by the traffic on other ports.

Such processes for handling packets and the assignment of a packet handling identifier are known in order to share resources between retransmitted packets and other transceiver functions. A packet can be forwarded directly to another communication device (or layer) or it may have a specific packet handling identifier, such as a Quality of Service (QOS) level. The QOS level of a packet indicates the importance of certain service metrics of one or more packets. A QOS metric is delay (or latency) and Packet Error Rate (PER) and include Bit Error Rate (BER), data rate, delay variation (or jitter), packet loss rate or time between error events (TBE). Voice or data (e.g., trading) traffic may have very low latency requirements and low packet error rate.

Telecommunication networks use a wide variety of infrastructure methods for transmitting data depending on a variety of factors including the bandwidth of the connection, the need of security for the data, the type of data being transmitted, and the routing of the signals between the source and the destination. Many conventional methods compress the transmitted data into packets that include header information that is used by the network during the transmission process. The use of frames at the data link layer to transport a data payload from a packet may be referred to as "encapsulating" the data. Such conventional encapsulation methods include High-Level Data Link Control (HDLC), Point-to-Point Protocol (PPP) in HDLC-like framing (Internet Engineering Task Force RFC 1662), Multiprotocol Encapsulation (MPE), Generic Stream Encapsulation (GSE), and Unidirectional Lightweight Encapsulation (ULE).

Well known transmission systems include the Ethernet protocol ISO/IEC 8802-3 (ANSI/IEEE Std. 802,3, 1993 edition) that defines a half-duplex media access mechanism and permits all stations to access network channel with equality. Each station includes an Ethernet interface card that in some cases may use carrier-sense multiple-access with collision detection (CSMA/CD) to listen for traffic on the media. A station having data to send will attempt to access the channel by waiting a predetermined time after the deassertion of a receive carrier on the media, known as the interpacket gap (IPG) interval. In some cases a full duplex environment may be provided and referred to as IEEE 802.3x, Full Duplex with Flow Control-Working Draft (0.3). Traffic is not distinguished or prioritized over the medium. The environment provides a two-way, point-to-point communication link between two network stations. In some cases two stations can simultaneously transmit and receive Ethernet data packets between each other without collision. An example of data evaluation may include setting the first value of the frame delimiter to 0xC7 (11000111) and setting the second value of the frame delimiter to 0x47 (01000111).

The IEEE 802.3z Task Force has defined shared and full-duplex gigabit Ethernet. Slot time of 512 bytes (4,096 bits) is available without increasing the minimum frame length, and providing frame bursting in which a station sends several frames separated by the extend carrier symbols in a single burst. Gigabit Ethernet (full duplex) operates by a station operating according to the conventional CSMA/CD protocol when attempting to transmit the first packet (at speeds under 10G).

IEEE 802.12-1995, "Demand Priority Access Method, Physical Layer and Repeater Specification for 100 Mb/s Operation," also known as the VG ANYLAN network, uses a centralized hub to arbitrate among the requests from network stations. The hub grants access to the stations in a round robin fashion and the VG ANYLAN network requires control by a central hub.

Prior art systems such as Infiniband that use switched fabric topology or OSPF-TE require five seconds or more to recognize one link is unusable and when the RE link is up but has a high Bit Error Rate (BER) there may be no failover at all. Once failover is achieved, all of the dropped packets are lost in a UDP/IP low-latency network. Once the RF system returns to normal it may take considerable time for the system to start using RF link again.

However, none of the above systems sufficiently resolve latency issues where gigabit or higher transmissions of data, such as electronic trading, which must have minimal latency and few or no missed packets and no waiting for and no impact from other traffic which shares the backbone latency. Also, each of the above systems fail to provide data transmission with consistently low latency. A system that improves upon the above technologies and protocols that provides data transmission with latency rates below the single, minimum-sized-packet serialization time is needed for point to point networks.

For example, a system for sending 1232 data bits per 1248 total bits (equivalent to 154/156 encoding) with no further encoding or loss of bandwidth, is distinguished from traditional encoding methods which provide 8 data bits per 10 total bits (8/10 encoding), 64 data bits per 66 total bits (64/66 encoding) and other encoding schemes which decrease the available data bandwidth as a percentage of the total bandwidth.

Also a system having a step of sending trunk fragments that are scrambled by 16 bit Exclusive-Or (XOR) Look Up Table (LUT) comprised of 16 to 1,232 scrambling data bits to create a scrambled trunk fragment ("XOR LUT"), but not scrambled by the self-organizing scrambling polynomial described by IEEE 802.3-2008 section 49.2.6 (Ethernet Scrambler), however, the Ethernet Scrambler has the side-effect of creating three bit errors for every bit which is flipped by weather or other transmission errors. The XOR LUT described herein does not create extra bit errors.

SUMMARY

The present invention provides for a method of combining and transmitting data fragments for multiple customer ports C1 to Cn sent over a first packet-switched computer network to a trunk network and redistributed over a second packet-switched computer network, each customer ports having a preselected bandwidth designation, the method comprising the steps of providing a First-In First-Out (FIFO) register to capture incoming data bits from each customer ports in parallel and speeds equal to or greater than 1 Gbps. The invention provides selectors connected to the FIFO outputs, each selector capable of mapping individual incoming data bits from different customer ports and combining them into the same trunk fragments where the number of bits in each trunk frame is a pro rata share of the bandwidth designated to each customer ports C1 to Cn. The invention includes filling each trunk fragment with data bits from customer ports C1 to Cn, by selector values for each customer, repeating the filling sequence for each fragment until sufficient trunk fragments form a filled trunk frame, sending each filled trunk frame across the trunk network having a transmission rate that is less than the sum of all customer incoming bandwidths but equal to the sum of the trunk bandwidth allocation for all customers and moving the filled trunk frames from the first incoming packet-switched computer network, through the bandwidth-limited trunk to the second packet-switched computer network and on to an intended receiving network endpoint.

In an embodiment, the invention has at least 2 customers and up to 64 customers connected to the first packet switched computer network. In an embodiment, the invention further comprising the step of filling of 16-bit trunk fragments using 4-bit selectors to select each customer data bit. In an embodiment, the invention further comprising the step of providing selectors that receive data bits from every customer on the first incoming packet-switched computer network as soon as the first data bits arrive without waiting for a complete data packet from any customer. In an embodiment, the invention further comprising the step of scrambling the 16 bit trunk fragment using a 16 bit Exclusive-Or (XOR) Look Up Table (LUT) comprised of 16 to 1232 scrambling data bits to create a scrambled trunk fragment. In an embodiment, the invention further comprising the step of adding a trunk frame cyclic redundancy check (CRC) of 12-bits to the filled trunk frame. In an embodiment, the invention further comprising the step of adding a trunk frame 4-bit count to the filled trunk frame. In an embodiment, the invention further comprising the step of resetting the selectors, using the XOR LUT and beginning the next trunk frame with no break or idle section between filled trunk frames.

In an embodiment, the invention further comprising the step of encrypting customer data by combining all customer bits using the XOR scrambler bits, the pro rata share for all customers, the method used to spread customer data within trunk frames and the map which divides up customer bits by timeslice. In an embodiment, the invention further comprising the step of sending trunk fragments that are scrambled by XOR LUT, but not scrambled by a self-organizing scrambling polynomial. In an embodiment, the invention further comprising the step of providing a receiver with an XOR LUT to descramble and break up the trunk fragments into data bits for each customer.

In an embodiment, the invention further comprising the step of receiving the trunk fragments at the receiving network end point of the second packet-switched computer network. In an embodiment, the invention further comprising the step of detecting missing data fragments and data bit errors in the incoming trunk fragments. In an embodiment, the invention further comprising the step of sending 1,232 data bits per 1,248 total bits (equivalent to 154/156 encoding) with no further encoding or loss of bandwidth. In an embodiment, the invention further comprising the step of correcting data bit errors and resynchronizing when the trunk fragments are lost. In an embodiment, the invention further comprising the step of providing each customer with a FIFO register, each customer assigned FIFO register for holding partially received customer data packets. In an embodiment, the invention further comprising the step of providing selectors that match customer data bits with the corresponding customer assigned FIFO register.

In an embodiment, the invention further comprising the step of receiving data fragments by the customer assigned FIFO register and locating an end-of-frame block type field. In an embodiment, the invention the end-of-frame being is designated as idle block type field. In an embodiment, the invention further comprising the step of transmitting the filled trunk frame as soon as enough data arrives to allow the continuous sending of all customer packets. In an embodiment, the invention having each customer's pro rata share of bandwidth equal the percentage of total subscribed bandwidth divided by 1,232 bits. In an embodiment, the invention of the selector uses 3, 4, 5 or 6 bit indexes to assemble 8 bit, 16 bit, 32 bit or 64 bit values to fill each trunk frame. In an embodiment, the invention having the completed packet between 1,232 bits and 1,520 bytes. In an embodiment, the invention including having data bits in every trunk frame. In an embodiment, the invention providing the customer ports bits that are spread out within every trunk frame so as to prevent waiting when multiple customers send a number of packets all at the same time. In an embodiment, the invention each customer ports's data bits are fragmented among multiple trunk fragments and frames.

In an embodiment, the trunk backbone has throughput of at least 199 Kb.

In an embodiment, the invention having data packets that are sent using configurable logic blocks (CLB). In an embodiment, the invention having the CLB as a layer 1+ field-programmable gate array or application specific integrated circuit (ASIC), the first packet switched computer network providing a relay for point to point wireless, Infiniband or Ethernet transmissions. In an embodiment, the invention having latency below 1 microsecond round-trip, assuming a trunk transmission speed of at least 10 Mbps.

In an embodiment, the invention comprising the step of, at an intended receiving network endpoint, generating a reception map on the basis of previously allocated time slots from other transmitting network endpoints and the reception map comprises a bitmap, wherein each data bit corresponds to one of a plurality of timeslots, each data bit indicating whether that corresponding timeslot has previously been allocated. In an embodiment, the invention comprising the step of periodically synchronizing, as between the transmitting network endpoint and the receiving network endpoint, a time period on which the proposed transmission map is used and without synchronization among network resources. In an embodiment, the invention synchronizing step comprises the step of using a connection over which a synchronization signal is transmitted, separate and apart from any network connection and the synchronizing step comprises the step of transmitting synchronization packets over the network.

Another aspect of the invention includes a method of transmitting Internet Protocol (IP), Infiniband or Ethernet packets for multiple customer ports $C_1$ to $C_n$ over a packet-switched computer network, comprising the steps of providing a First-In First-Out (FIFO) register having sixteen, four bit selectors, each selector capable of mapping for only one customer ports, creating a 16 bit trunk fragment, filling each trunk fragment from customer ports $C_1$ to $C_n$ by 4 bit selector values for each customer ports, repeating the filling sequence for each 16 bit fragment until sufficient trunk fragments form a filled trunk frame having at least 1,232 customer ports bits plus 16 bits of CRC and frame count and transmitting each filled trunk frame across a trunk network.

In an embodiment, the invention comprising the step of using only the idle frames sent before and after customer ports packets to distinguish between customer ports data and idle frames in order to provide layer 1+ transmission, as all possible packets of all formats may be sent and are surrounded by idle frames. In an embodiment, the invention having the filled trunk fragment of 16 bits or smaller. The method of claim 40 wherein each customer ports $C_1$ to $C_n$ has bits contained in every filled trunk frame. In an embodiment, the invention comprising the step of forwarding any and all customer ports packets to the correct destination based on the relay port from which it was received. In an embodiment, the invention comprising the step of forwarding all network administration, routing, discovery, query, reply, broadcast, unicast and multicast packets to the destination port on the second packet-switching network without changing the configuration or routing of the relay device and without sending those packets anywhere except the destination port for the sending customer ports. In an embodiment, the invention including each trunk frame being fragmented. In an embodiment, the invention having a trunk backbone throughput that is at least 199 Kb.

In another aspect, the invention provides a low latency relay comprising a First-In First-Out (FIFO) register to capture incoming data packets from each customer ports in parallel and speeds equal to or greater than 1 Gbps selectors connected to the FIFO outputs, each selector capable of mapping individual incoming bits from different customers and combining them into the same output trunk fragments in order to create trunk fragments where the number of bits indexed in each trunk frame for each customer ports is a pro rata share of bandwidth designated to each customer ports $C_1$ to $C_n$, the selectors filling each trunk fragment with bits from customers $C_1$ to $C_n$, by selector values for each customer ports, selectors repeating the filling sequence for each fragment until sufficient trunk fragments form a filled trunk frame, an Exclusive-Or (XOR) Look Up Table (LUT) comprised of 16 to 1232 scrambling bits to create scrambled trunk fragments and a trunk network for transmitting each filled and scrambled trunk frame at a transmission rate that is less than a combination of all customer ports incoming bandwidths from a first incoming packet-switched computer network.

In an embodiment, the invention provides between 2 and 64 customers per relay and 16 to 64, 4 bit selectors to fill each trunk fragment. In an embodiment, the invention comprising a first packet-switched computer network linked to a trunk network, linked to a second packet-switched computer network and the filled and scrambled trunk frame received by the second packet-switched computer network and being unscrambled by an XOR LUT.

In an embodiment, the invention having selectors that receive data bits from every customer ports as soon as the first bits arrive without waiting for a complete packet from any customer ports. In an embodiment, the invention having packets that are sent using configurable logic blocks (CLB) converted into dedicated logic blocks. In an embodiment, the invention having the CLB being a layer 1+ field-programmable gate array (FPGA) or application specific integrated circuit (ASIC) of the relay.

In an embodiment, the invention provides relay latency below 1 microsecond round-trip, the latency measured through all utilized CLBs and eight network ports including: customer ports port in first network, trunk port out, trunk port in, customer ports port out second network and then back: customer ports port in second network, trunk port out, trunk port in, customer ports port out first network. In an embodiment, the invention CLB is a layer 1+ field-programmable gate array (FPGA) or application specific integrated circuit (ASIC) of a relay device of claim 1 for point-to-point wireless, Infiniband or Ethernet transmissions. In an embodiment, the invention provides relay device latency that is below 1 microsecond round-trip, the latency measured through all utilized CLBs and eight network ports including: customer ports port in first network, trunk port out, trunk port in, customer ports port out second network and then back: customer ports port in second network, trunk port out, trunk port in, customer ports port out first network.

In an embodiment, the invention further comprising the step of, at an intended sending or receiving trunk endpoint, a map dividing trunk frames and fragments on the basis of previously allocated time slots, the map comprises a bitmap, wherein each bit corresponds to one of a plurality of timeslots, each bit indicating which customer ports bit from which customer ports is assigned to which trunk fragment and which fragment bit within a trunk frame.

In an embodiment, the invention provides at an intended sending or receiving trunk endpoint, a map is provided dividing trunk frames and fragments on the basis of previously allocated time slots, the map comprises a bitmap, wherein each bit corresponds to one of a plurality of timeslots, each bit indicating which customer ports bit from which customer ports is assigned to which trunk fragment and which fragment bit within a trunk frame. In an embodiment, the invention encrypting customer ports data that is provided by combining all customer ports bits using XOR scrambler bits, the pro rata share for all customer, the method used to spread customer ports data within trunk frames and the map which divides up customer ports bits by time slice.

In an embodiment, the invention forwarding any and all customer ports packets to the correct destination is based on the relay port from which it was received. In an embodiment, the invention forwarding all network administration, routing, discovery, query, reply, broadcast, unicast and multicast packets to the destination port on the second packet-switching network is provided without changing the configuration or routing of the relay device and without sending those packets anywhere.

Another embodiment of the invention provides for a relay for receiving Internet Protocol (IP), Infiniband or Ethernet packets for multiple customers $C_1$ to $C_n$ over a packet-switched computer network. The relay comprising a First-In First-Out (FIFO) register having sixteen, four bit selectors, creating a 16 bit trunk fragment and filling each trunk fragment with data bits from customer ports $C_1$ to $C_n$ and repeating the filling sequence for each 16 bit fragment until sufficient trunk fragments form a filled trunk frame having at least 1,232 customer ports bits plus 16 bits of cyclic redundancy check (CRC) and a frame count and a sender for transmitting each filled trunk frame across a trunk network.

In an embodiment, the relay has only idle frames that are sent before and after customer port packets to distinguish between customer ports data and idle frames in order to provide layer 1+ transmission, as all possible packets of all formats may be sent and are surrounded by idle frames. In an embodiment, the relay provides a filled trunk fragment that is 16 bits or smaller and each selector capable of mapping for only one customer. In an embodiment, the relay has each customer port $C_1$ to $C_n$ transmit bits received in every filled trunk frame.

In an embodiment, the relay has all customer packets forwarded by the sender to the correct destination based on the relay port from which it was received.

In an embodiment, the relay has all network administration, routing, discovery, query, reply, broadcast, unicast and multicast packets forwarded by the sender to the destination port on the second packet-switching network without changing the configuration or routing of the relay device and without sending those packets anywhere except the destination port for the sending customer ports. In an embodiment, the relay has each trunk frame fragmented. In an embodiment, the relay has the trunk network throughput at least 199 Kb.

The invention also provides a low latency logic device comprising a First-In First-Out (FIFO) register to capture incoming data packets from each customer port in parallel and speeds equal to or greater than 1 Gbps, selectors connected to the FIFO outputs, each selector capable of mapping individual incoming bits from different customer ports and combining them into the same output trunk fragments in order to create trunk fragments where the number of bits indexed in each trunk frame for each customer port is a pro rata share of bandwidth designated to each customer $C_1$ to $C_n$ the selectors filling each trunk fragment with bits from customer ports $C_1$ to $C_n$, by selector values for each customer port, selectors repeating the filling sequence for each fragment until sufficient trunk fragments form a filled trunk frame, an Exclusive-Or (XOR) Look Up Table (LUT) comprised of 16 to 1232 scrambling bits to create scrambled trunk fragments; and a sender for transmitting each filled and scrambled trunk frame across a trunk network at a transmission rate that is less than a combination of all customer port incoming bandwidths from a first incoming packet-switched computer network.

In an embodiment, the logic device has between 2 and 64 customer ports per logic device and 16 to 64, 4 bit selectors to fill each trunk fragment. In an embodiment, the logic device comprises a first packet-switched computer network linked to a trunk network, linked to a second packet-switched computer network and the filled and scrambled trunk frame received by the second packet-switched computer network and being unscrambled by an XOR LUT. In an embodiment, the logic device has selectors that receive data bits from every customer port as soon as the first bits arrive without waiting for a complete packet from any customer port.

In an embodiment, the logic device has packets that are sent using configurable logic blocks (CLB) converted into dedicated logic blocks. In an embodiment, the logic device has the CLB in a layer 1+ field-programmable gate array (FPGA) or application specific integrated circuit (ASIC) of the logic device. In an embodiment, the logic device has latency below 1 microsecond round-trip, the latency measured through all utilized CLBs and eight network ports including: customer ports port in first network, trunk port out, trunk port in, customer ports port out second network and then back: customer ports port in second network, trunk port out, trunk port in, customer ports port out first network.

In an embodiment, the logic device has the CLB at a layer 1+ field-programmable gate array (FPGA) or application specific integrated circuit (ASIC) of a logic device of claim 1 for point-to-point wireless, Infiniband or Ethernet transmissions. In an embodiment, the logic device has latency is below 1 microsecond round-trip, the latency measured through all utilized CLBs and eight network ports including: customer ports port in first network, trunk port out, trunk port in, customer ports port out second network and then back: customer ports port in second network, trunk port out, trunk port in, customer ports port out first network.

In an embodiment, the logic device comprises the step of, at an intended sending or receiving trunk endpoint, a map dividing trunk frames and fragments on the basis of previously allocated time slots, the map comprises a bitmap, wherein each bit corresponds to one of a plurality of timeslots, each bit indicating which customer ports bit from which customer ports is assigned to which trunk fragment and which fragment bit within a trunk frame. In an embodiment, the logic device has an intended sending or receiving trunk endpoint, a map is provided dividing trunk frames and fragments on the basis of previously allocated time slots, the map comprises a bitmap, wherein each bit corresponds to one of a plurality of timeslots, each bit indicating which customer ports bit from which customer ports is assigned to which trunk fragment and which fragment bit within a trunk frame.

In an embodiment, the logic device encrypting customer port data provided by combining all customer bits using XOR scrambler bits, the pro rata share for all customer ports, the method used to spread customer ports data within trunk frames and the map which divides up customer ports bits by timeslice.

In an embodiment, the logic device forwarding any and all customer ports' packets to the correct destination is based on the logic device port from which it was received. In an embodiment, the logic device forwarding all network administration, routing, discovery, query, reply, broadcast, unicast and multicast packets to a destination port on the second packet-switching network is provided without changing the configuration or routing of the logic device and without sending those packets anywhere except the destination port for the sending customer port.

BRIEF DESCRIPTION OF DRAWINGS

FIG. 6 is a hypothetical calculation of the savings of bits provided by the present invention.

Figure 1:
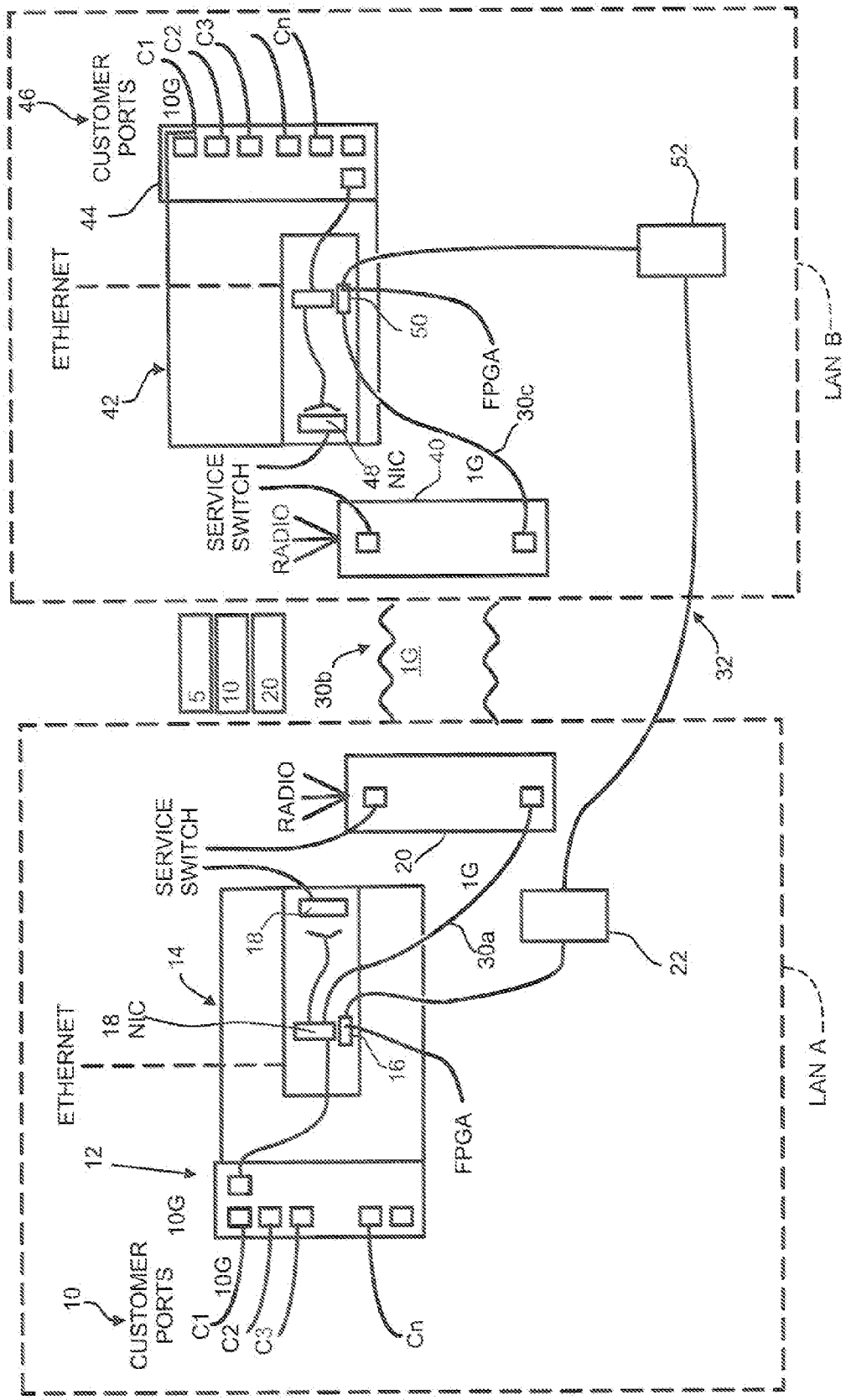
FIG. 1 depicts a schematic view of the components present invention.

While the invention is amenable to various modifications and alternate forms, specific embodiments have been shown by way of example in the drawings and will be described in detail, it should be understood that the intention is not to limit the invention to the particular embodiments described. The intention is to cover all modifications, equivalents and alternatives falling within the spirit and the scope of the invention.

DETAILED DESCRIPTION

The overall architecture of the present invention may be understood with respect to FIG. 1. However, other layouts and system architecture and equipment may be used to accomplish the present invention and the components of FIG. 1 provide a single example to accomplish such invention. Local Area Network (LAN) A is exemplary of a central routing station or data center that receives incoming data from multiple customer ports $C_1$-$C_n$ via fiber optic or copper cabling 10 (LAN A) or 46 (LAN B). In the preferred embodiment, the data is transmitted from customer ports at 10 Gigabit speeds (G) and are received by either a switch/relay 12 or an appliance or relay that eliminates the switch and can handle multiple, simultaneous 10 G or faster transmissions. For example, many 10 G small form factor pluggable transceivers (SFP) or Quad SFP (QSFP) or SFP+ transceivers may be used by the switch/relay 14, 42 or appliance to receive the incoming data. Multiple relays 14 or appliances may be provided at the data center for receiving data from hundreds or thousands of customers. Each switch is connected to a server/relay 14, or each appliance. The relay 14 embodies both the switches and server, preferably also capable of receiving and transmitting data at 10 G. Each relay 14 or appliance includes multiple network interfaces 16 to send, receive, control and manage the data packets.

In an embodiment, a logic device such as a Field Programmable Grid Array (FPGA) 16, 50 may provide data management, network interface and packet control. For example, a Xilinx 7 Series FPGA 16 with thousands of configurable logic blocks (CLB) may be programmed to accomplish many of the functions of the present invention. (Although "FPGA" is denoted throughout the application, any functionally equivalent electronic circuit or logic device may be used for this invention.) Other types of chips or logic devices may be used for data management, network interface and packet control, such as an ASIC. The server/relay 14 or appliance also includes a network interface card (NIC) 18 which aids in the transmission of the data.

In a preferred embodiment, the data is simulcast via a trunk network that may include a radio 20 which transmits using free space optics (FSO) or a microwave (MW) radio frequency (RF) or a millimeter wave (MMW) RF in multiple hops by line of sight transmission of data at 10 transmission rate or higher to targeted receivers/antennas via point-to-point trunk network 30b to obtain the data on a second local area network (LAN) B. In an embodiment, LAN A and LAN B may include a packet switched computer network providing transmissions as 10 Gbs.

In a preferred embodiment, data is simulcast via fiber optic cables 32 or a second RF link 30b using a disparate route to LAN B. A transmitter 22 transmits the data across fiber optic cables 32 or second RF link to the receiving LAN B. A transmitter 22 transmits the data across fiber optic cables 32 to the receiving LAN B. Due to the high importance of receiving data without error and to limited latency, the simulcasting of data across wireless transmission 30b and fiber cables 32 provides the needed redundancy in order to avoid dropped packets. As is well known, RF transmissions are affected by weather and on bad weather days the fiber optic transmission means 32 (while not as fast as RF transmissions) may be preferred on such days/stormy periods.

Local area network (LAN) B represents a receiving location, such as a stock exchange or electronic trading facility. Wireless signals are received by radio 40 and transmitted at 1G or higher speeds via fiber link 30c to server/relay 42 or appliance which includes a network interface card 48 and a motherboard network interface 48 including a MAC layer, for example, on an FPGA 50. Receiver 52 receives fiber optic or second wireless data from the cable 32 which is transmitted to the server/relay 42. The server/relay is connected to switches 44 or appliances which include transceivers for transmitting data across fiber optic lines or copper lines 46 to customers. The switches may use QSFP transceivers, SFP transceivers or SFP+ transceivers to provide 40 G speeds or higher. In an embodiment, each customer port $C_1$-$C_n$ has a transceiver for transmitting and receiving data bits/packets.

Figure 2:
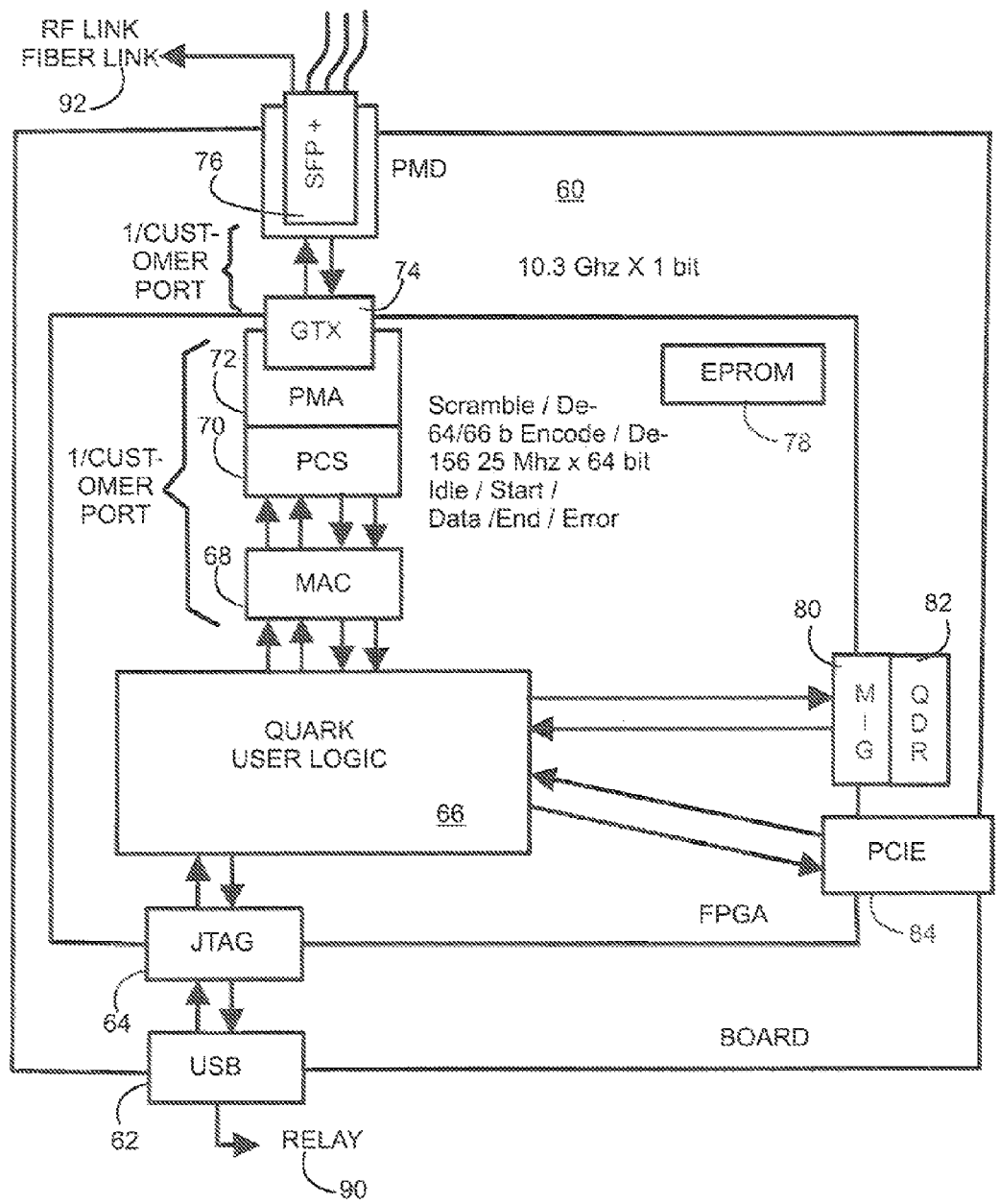
FIG. 2 depicts a board layout view of components of the present invention.

Turning to FIG. 2, the mother board 60 within the server 14, 42 is depicted. The board 60 includes a universal serial bus (USB) 62 for receiving data from a server/relay 90. The data from the USB connection is transmitted from the board to a single processing unit such as an FPGA 16. The board 16 also includes a Joint Task Action Group (STAG) interface 64 under IEEE 1149.1-1990 provides an interconnect between the USB and the user logic 66 of the FPGA. The JTAG 64 provides a serial connection to the FPGA 16 and facilitates programming of the FPGA 16. The functionality of the configurable logic block (CLB) of the user logic 66 will be explained in more detail below. The media access control (MAC) 68 receives the instructions from the user logic 66 that are transmitted via the physical code in sublayer (PCS) then through the physical medium attachment (PMA). And via the GTX filter circuit 72, 74 to transmit the data from the FPGA to the QSFP or SFP+ transceivers 76.

The FPGA 16, 50 may also include an erasable programmable read-only memory (EPROM) 78 as a back-up to store the user logic. A memory interface MGI and QDR 82 are provided by the FPGA for interfacing with the user logic 66. Peripheral component interconnect express (PCIE) 84 is also provided with the FPGA to interact with the user logic 66.

Turning to FIG. 2, the network interface 16 is preferably a single-chip, 32-bit or 64-bit electronic circuit Ethernet controller (e.g. FGPA), and provides an interface between a local bus of a computer, for example, a peripheral component interconnect (PCIE) 84 local bus, and an Ethernet-based gigabit or faster media. The PCIE bus interface unit may be under the control of the DMA buffer management unit receives data that is passed to the PCI bus transmit FIFO buffer described below. The PCIE 84 may be used to dump the bad packets from the receiver 206. A transceiver 76 may send and receive data packets on the network media at gigabit rates across a physical layer device (e.g., a SFP or four gigabit serial transceiver).

In alternate embodiments the network interface 16, 50 may also include a PCI bus interface unit, a direct memory access (DMA) buffer management unit and a network interface portion 16, 50. The network interface portion may include an eXtended Gigabit Media Independent Interface (XGMII) 23b for connecting external 1000 Mb/s or 10000 Mb/s transceivers, an External Address Detection Interface (EADI) 23c, and an 64b/66b decoder 24. Full-duplex operation can be performed by the XGMII interface. The interface may also include, an LED control and an expansion bus interface for boot RAM (e.g., EPROM or Flash memory) during startup, and an IEEE 1149.1-compliant JTAG Boundary Scan test access port interface. The network interface 16, 50 may also include a network port manager and an auto-negotiation unit that communicates via the media with a corresponding auto-negotiation unit in the hub serving the network interface with a corresponding auto-negotiation unit in a centralized hub, repeater, or switch that provides shared receive carrier and collision signals between different network stations.

As depicted in FIG. 2, the GTAG 64 manages the reception of the data by the network interface unit 16, 50 and retrieves information form header bytes that are transmitted at the beginning of transmissions. The header information (identifying the byte length of the received frame) is passed to the FIFO control of the user logic 66.

The above-described MAC 68 may be configured to operate in a shared ten gigabit Ethernet network by providing a burst of data packets. Asynchronous data or packetized data can be arranged as datagrams, using the User Datagram Protocol (UDP) and the Internet Protocol (IP). UDP/IP are the fragmented datagrams placed in an IP packet format. The UDP/IP packet is forwarded across a network and the transport and networking layer of the OS1 reference model can be sent according to a data layer or physical layer of the OS1 reference model according to the Ethernet protocol. The datagrams can be removed from the Ethernet protocol and sent using a different protocol if desired. A PHY transceiver and, specifically, the PHY receiver portion, can decode and recognize 64B/66B encoded data associated with the Ethernet protocol. If the sample rate is 48 MHz, the total bit rate of the network between any two nodes is 48 M/frames sec.×64 bytes/frame×8 bits/byte=24.576 Gbits/sec.

When an electronic circuit logic device such as an FPGA 16 is activated or "powered up," routing tables are broadcast across the control channel to each of the other devices upon the network. The control channel includes configuration (or reconfiguration) routing tables needed to accommodate data transfer between the newly activated device. The routing table is created to accommodate all of the various channels or frame portions established to receive the various types of data. Data is synchronously sent across the network between activated devices. The routing table within a memory medium will then identify which bytes within a frame is associated with a particular channel when subsequent communication is desired. In order to use an existing Ethernet PHY, the compliant network transmission protocol must use 64B/6B coding which Ethernet uses. The recovered clock is available since the Ethernet PHY must generate it to recover data in Ethernet mode.

The Ethernet MAC 68 may have a learning session Ethernet MAC frame and a compression session Ethernet MAC frame and may be divided into a first portion comprising two MAC address fields, and a second portion comprising a rest of the unmodified Ethernet MAC frame.

In an embodiment, the network interface card 18, 48 may have four ports. Port 1 for FR, port 2 for fiber, port 3 for customer ports transmissions and port 4 for free space optics. However, in an alternate embodiment, the system may be updated to provide between four and thirty-two ports. For example, in a system having 24 ports, there will be 20 extra ports for customer ports customization. In addition, some of these extra ports may be used for monitoring and controlling the system using out-of-band data communications. In addition, the system may have additional non-Ethernet ports for communication between multiple instances of the system, such as in a Y network layout, where three of the systems will sit in the same rack and communicate between themselves. For example, each of the 20 extra ports may be for a specific customer ports input. In that way the data packets received at each port will have a designation provided by the port where the data is received. By providing port designations to the data, the packet header information may be reduced—due to the easier management of data incoming from each designated port. In this way the data packets can be managed at a layer one level requiring less handling at layer two of the Ethernet and lower latency.

Figure 3:
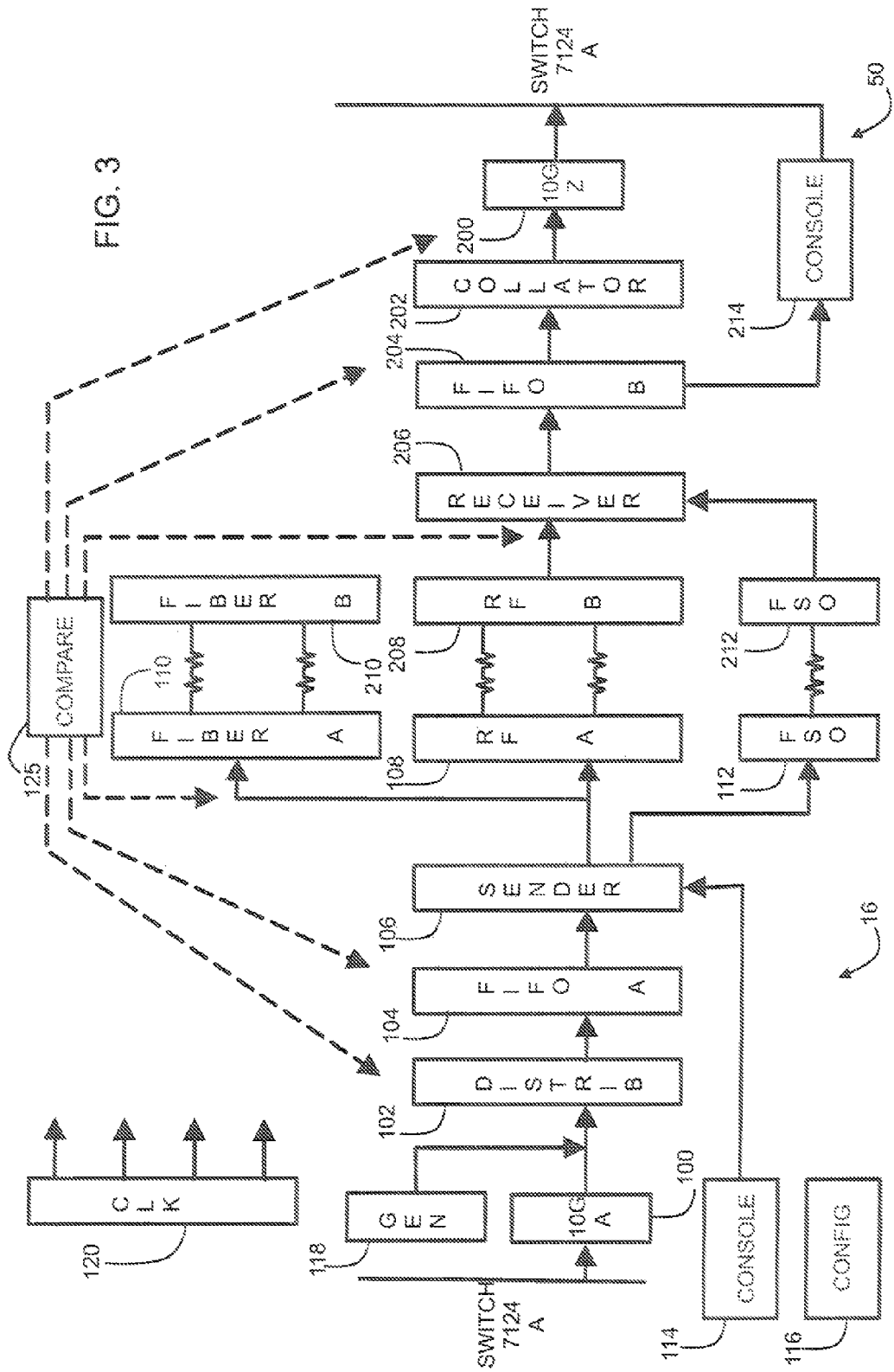
FIG. 3 depicts a schematic view of the functionality of a relay of the present invention.

Turning to FIG. 3, the user logic 66 of the FPGA will be described. The left side of the diagram of FIG. 3 represents the electronic circuit or FPGA 16 of the server 14 located in LAN A, including a packet switched computer network and the right side of the diagram of FIG. 3 represents the electronic circuit or FPGA 50 located in server/relay 42 of LAN B that includes a packet switched computer network. The user logic 66 of the FPGA 16 includes a distributor 102 for receiving 10 G transmissions 100. For example, a 64 bit packet would be received by the distributor 102 and is loaded into the First-In-First-Out (FIFO) register 104. The FIFO 104 functionality will be described in more detail below. Once the FIFO processing is completed, it transfers the 64 bit data to sender 106 which transmits the data out of the FPGA as discussed above using transceivers such as a QSFP 76 or other transceiver and simulcast as discussed above through wireless radio 108, a fiber transmission 110 and free space optical transmission 112.

These transmissions are monitored by Console 114. In an embodiment, the Console can also run diagnostic testing at night when the system is inoperable or very few transmissions occur. Configuration block 116 also interacts with the user logic and provides for configuration of the FPGA 16 when the system is not running—usually at night. A Generation block 118 interacts with the Distributor 102 and a clock 120 manages the running of the FPGA 16. A Compare program 125 also monitors data transmission between the FPGAs 16 and 50.

The data transmitted from the FPGA 16 from LAN A is transmitted via simulcast to LAN B (FIG. 1) and is received by the server/relay 42 including FPGA 50 (FIG. 3). Wireless data is received by wireless radio 208 which transmits the packets to receiver 206, which are loaded into the FIFO 204. A more detailed description of FIFO 204 will be described below with respect to the present invention. The FIFO 204 transmits its data to the Collator 202, which transmits out of the server/relay via 10 G speeds, preferably.

The FPGA 50 (FIG. 3) also includes data packet transmissions via fiber 210, which is linked to the Receiver 206 for receiving the data transmission. A free space optical (FSO) transceiver 212 receives fiber transmission and links to the Receiver 206, A Console 214 receives monitoring data from the Receiver 206.

Figure 4A:
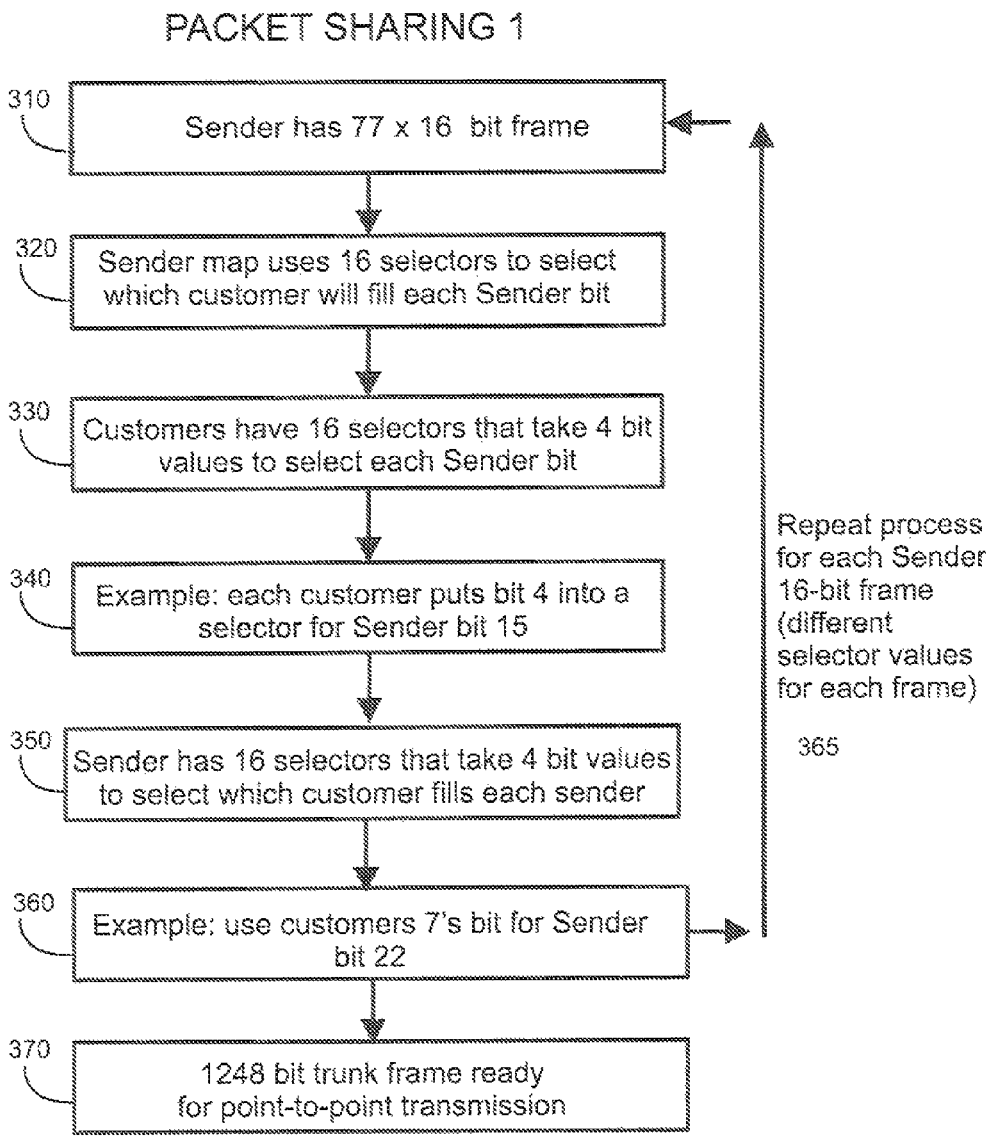
FIG. 4A depicts a flow diagram outlining the operation of an embodiment of the present invention using 4-bit values and a 16 bit frame.

The purpose of the packet sharing invention is to lower the latency of communications and to offer a consistent latency regardless of other traffic on the system, to share the available bandwidth among multiple customers using a fixed schedule, to make sure that no network storm of incoming customer ports traffic will effect the latency of any customer ports without reducing the throughput of the system and to make each packet transmission more efficient by distributing bits from different customer ports transmissions to fill every wireless bit with data. In a typical round robin type distribution method, some transmission packets from some customers are treated unequally with respect to other customers because packets are sent one packet per customer ports at a time. For example, the following service contracts are provided: customer ports one is allotted transmission at 1 megabit per second, customer ports two is allotted 3 megabits per second, customer ports three is allotted 1 megabit per second, customer ports four is allotted 5 megabits per second, and customer ports five is allotted 800 megabits per second. Due to the standard method of sharing bandwidth none of the customers will receive optimal latency and due to the lopsided allotment of bandwidth to customer ports five, customers 1-4 may have packets queued up for considerable time (one-half to several microseconds) under typical systems, such as round-robin mechanisms. For example, under round-robin scheduling, if each of customers 1-5 have transmissions packets arriving at the switch 12 (FIG. 1) at the same time, the Distributor 102 (FIG. 3) would queue up every other customer ports while each customer ports is serviced, and as a maximum sized packet from customer ports five is being serviced customers one through four would wait from 0.5 to 12 microseconds, depending on whether the traffic is fragmented or not. Where IP fragmentation is used, latency of the system is reduced to 0.5 microseconds, but the throughput of the system is also reduced because each IP fragment requires another header. To resolve this inefficient process, the present invention provides for packet sharing as follows:

The packet sharing invention will be described with respect to FIGS. 4A, B, C and 5A, B. In an embodiment, each trunk fragment may be maximum sized (1500+ bytes) to keep the throughput of the system at a maximum. Each trunk frame every customer ports has some of each customer's bits in every trunk frame. In other embodiments, each trunk fragment is maximum sized at 1,248 bits to reduce latency.

Figure 5A:
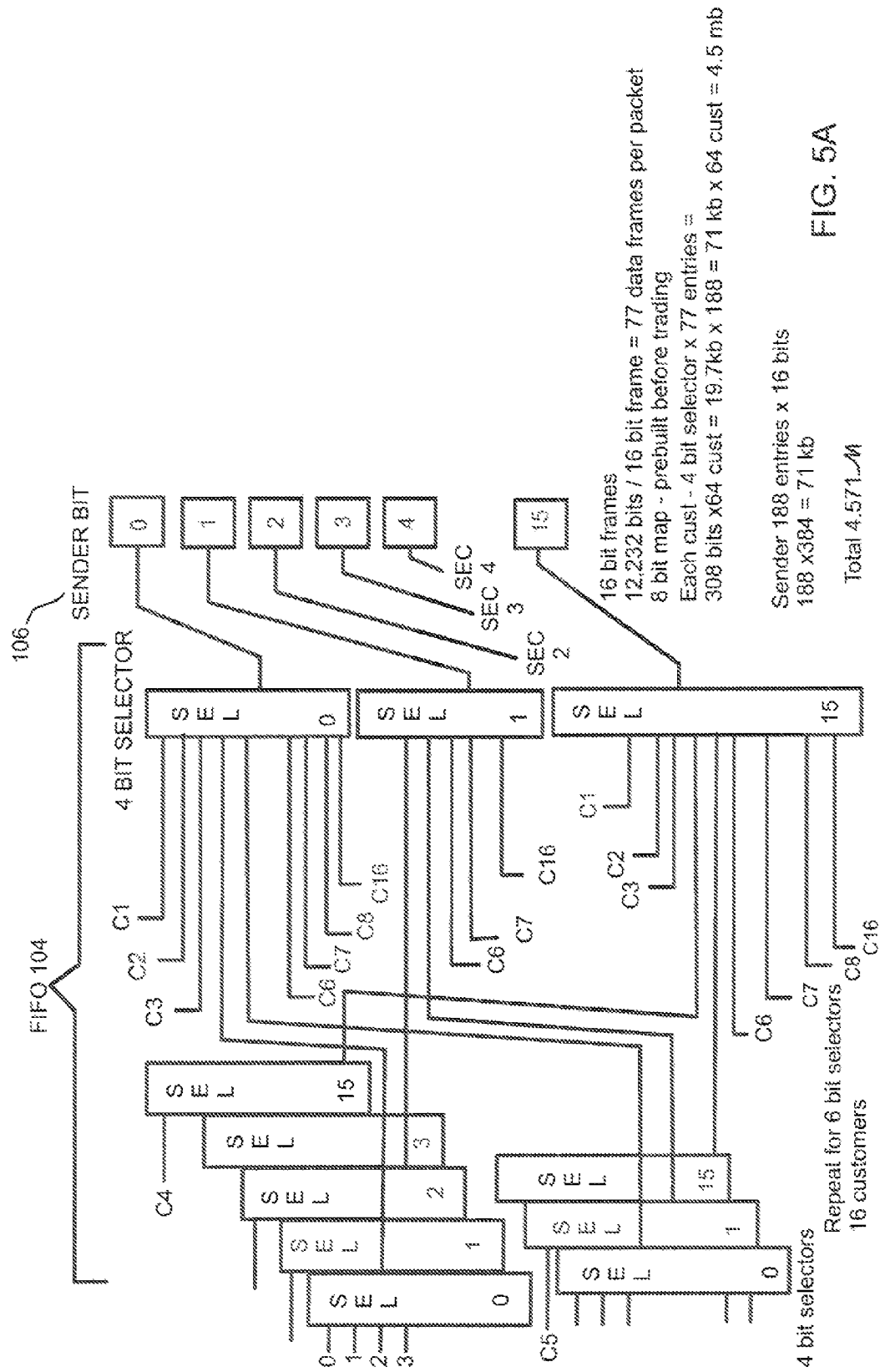
FIG. 5A depicts a schematic view of an embodiment of a FIFO register with respect to FIG. 4A.

The packet sharing invention constructs packets made up of data bytes, data bits and data fragments for each customer port, one bit at a time with respect to FIG. 5A as follows. While constructing trunk frames (e.g. trunk bits to be transmitted from a first packet switched network to a trunk network) quickly enough to maintain a completely full wireless trunk network backbone 30, 32 (FIG. 1). At step 310 a sender 105 has a 77×16 bit frame located at sender 106. In an alternate embodiment, a 187×64 bit frame may be located at sender 106 (FIG. 3, 5A). At step 320 (FIG. 4A) the sender map uses 16 selectors of the FIFO register 104 (FIG. 5A) to select which customer ports will fill in each sender customer data bit. There is selector for each customer port in the FIFO 104 register (FIG. 3) to fill each trunk fragment sender bit 106. At step 330 data bits received from the customer's ports (C1-C16) are transmitted to 16 selectors that take 6 bit values to select each trunk fragment sender bit at sender 106. At step 340, for example each customer port transmits bit 4 into the Selector for data fragment sender bit 17. At step 350 the sender has 16 selectors that take 6 bit values to select and customer data bits fill each sender 106. For example, at step 360, you may use the customer ports 7's bit per sender/trunk bit 22. The selector combines data bits where the number of data bits in each trunk frame is a pro rata share of the bandwidth that had been previously designated for each customer port $C_1$ to $C_n$ (where n is the total number of customers).

This process repeats at step 365 (FIG. 4A) for each sender 16 bit frame and provides different selector values for each frame. The Selector continues to look for empty bits to fill with each customer ports payload. This repetition of loop 365 starting again at step 320 will continue until a custom 1,248 bit trunk frame is ready for a point-to-point transmission at step 370 from the sender 106 (FIG. 3, 5A). Also, selectors can receive data bits from every customer part on the first incoming packet-switched computer network as soon as the first data bits arrive without waiting for a complete data packet from any customer part by tracking 4 clock cycles using the standard FIFO (a complete packet takes at least 16 clock cycles).

```
Pseudo-code for Packet Sharing Device
//// Customers 1 to n all get one instance of this. All instances run in parallel.
while( incoming_network1_packet )
    if( packet_is_not_idle )
        RxFifo <= data_packet; // Store data packet in Customer ports's RX FIFO.
    while( request_for_customer ports_bits )
        selector( bits_requested_from_me )
        0: // Do nothing.
```

```
1-16: begin
    sender <= my_bits; // Could be from Bypass_Data or RxFifo.
    my_bits <= my_bits << num_bits; // Shift left by number of bits retrieved.
    if( my_bits < 16 && RxFifo_is_not_empty )
        my_bits <= myBits && next_Rx Fifo_entry; // Grab next Fifo entry.
End
```

Data packets are decrypted before being transmitted by the second network. Each customer fragment must be removed from each packet after exiting the trunk network. As shown in FIG. 3, the data packets are transmitted across the trunk network 108, 110, 112, 208, 210, 212 to receiver 205 to be decrypted by using an XOR LUT at a selector of the FIFO register 204. Collator 202 then transmits the assembled data packets via transceiver 200, typically at about 10 Gps.

6 bit values to select each sender bit at sender 106. At step 440 for example, each customer ports puts bit 4 into the selector for sender bit 17. At step 450 the sender has 64 selectors that take 6 bit values to select and customer ports fills each sender 106. For example, at step 460, the sender uses the customer ports 7's bit per sender bit 22. This process repeats at step 465 for each sender 64 bit frame and provides different selector values for each frame. The selector continues to look for

```
// In the Packet Sharing Device on the other end of the Trunk
// One Receiver instance that gets bits from the Trunk and distributes them to all
customers.
    while( incoming_trunk_bits ) begin
        trunk_bits <= Trunk XOR descrambler_mask; // XOR LUT
        crc_value <= CRC( trunk_bits, crc_value ); // Keep a running total of what the CRC
will be with no bit errors.
        if( trunk_bits < 1232 ) begin
            Selector( bits_by_customer ports )
                Cust1 <= trunk_bits;
                Cust2 <= trunk_bits;
                CustN <= trunk_bits;
            end
        else begin
            if( crc_value != trunk_crc_value )
                RecoverDamagedBits();
            if( frame_count != trunk_frame_count ) begin
                bad_frame_count <= bad_frame_count + 1;
                good_frame_count <= 0; // Reset the good frame count.
                if( bad_frame_count == 255 ) begin
                    Resynchronize();
                    bad_frame_count <= 0; // Reset the bad frame count.
                end
            end
            else if( bad_frame_count > 0 ) begin
                good_frame_count <= good_frame_count + 1;
                if( good_frame_count > 16 ) begin
                    bad_frame_count <= 0; // Reset the bad frame count.
                    good_frame_count <= 0; // Reset the good frame count.
                end
            end
            crc_value <= 0;              // Reset the CRC.
            trunk_bits <= 0;             // Reset the Trunk bit count.
            frame_count <= frame_count + 1;        // Increment the frame count.
        end
// Customers 1 to n all get one instance of this. All instances run in parallel.
while( incoming_bits_from_trunk ) begin
    if( packet_is_not_idle ) begin
        TxFifo <= incoming_bits_this_customer ports;
        if( end_of_data_is_near )
            Begin_sending_packet()
    end
    else
        Send_idle();
```

Figure 4B:
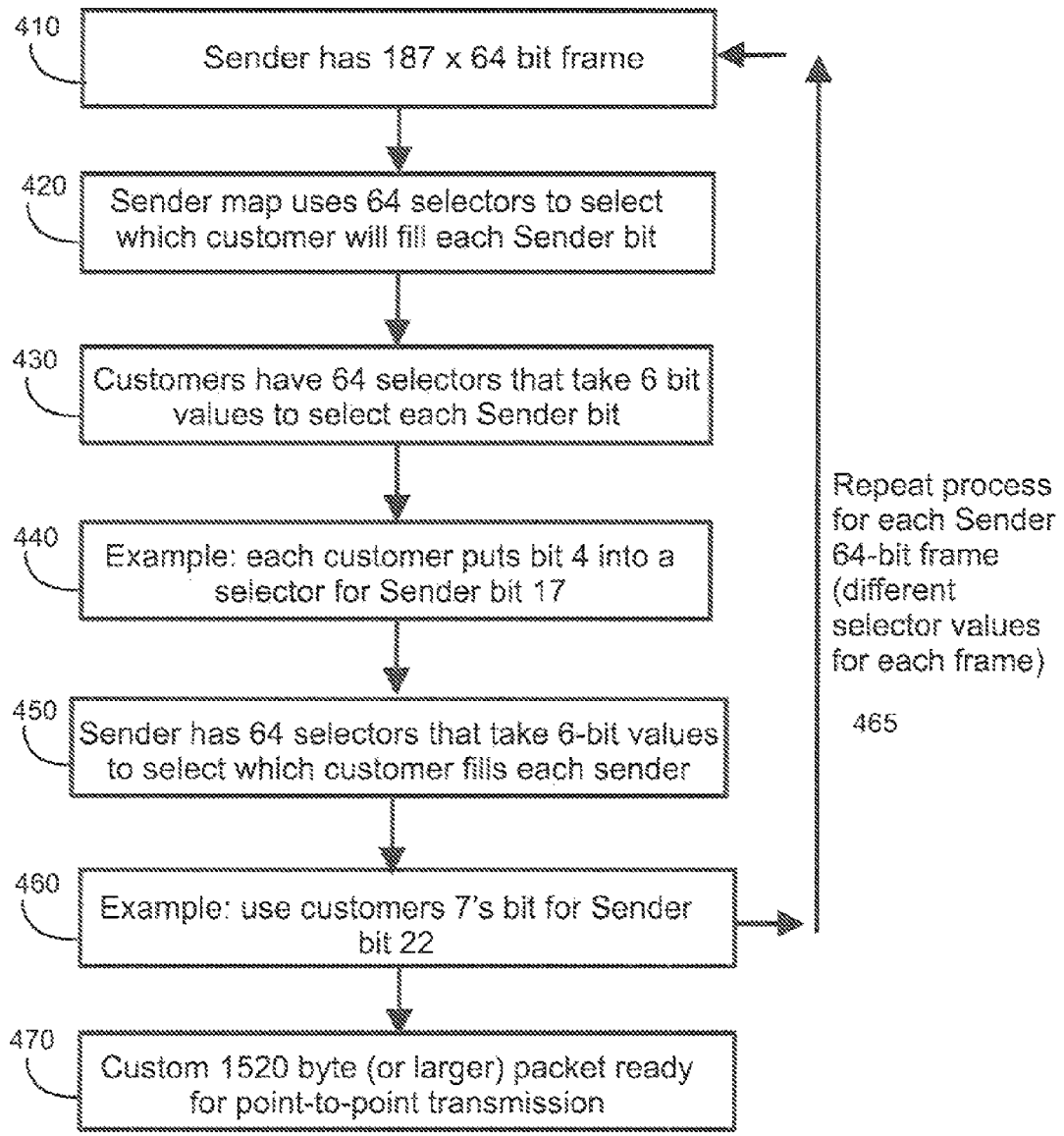
FIG. 4B depicts a flow diagram outlining the operation of an alternate embodiment of the present invention using 6-bit values and a 64 bit Frame.
Figure 5B:
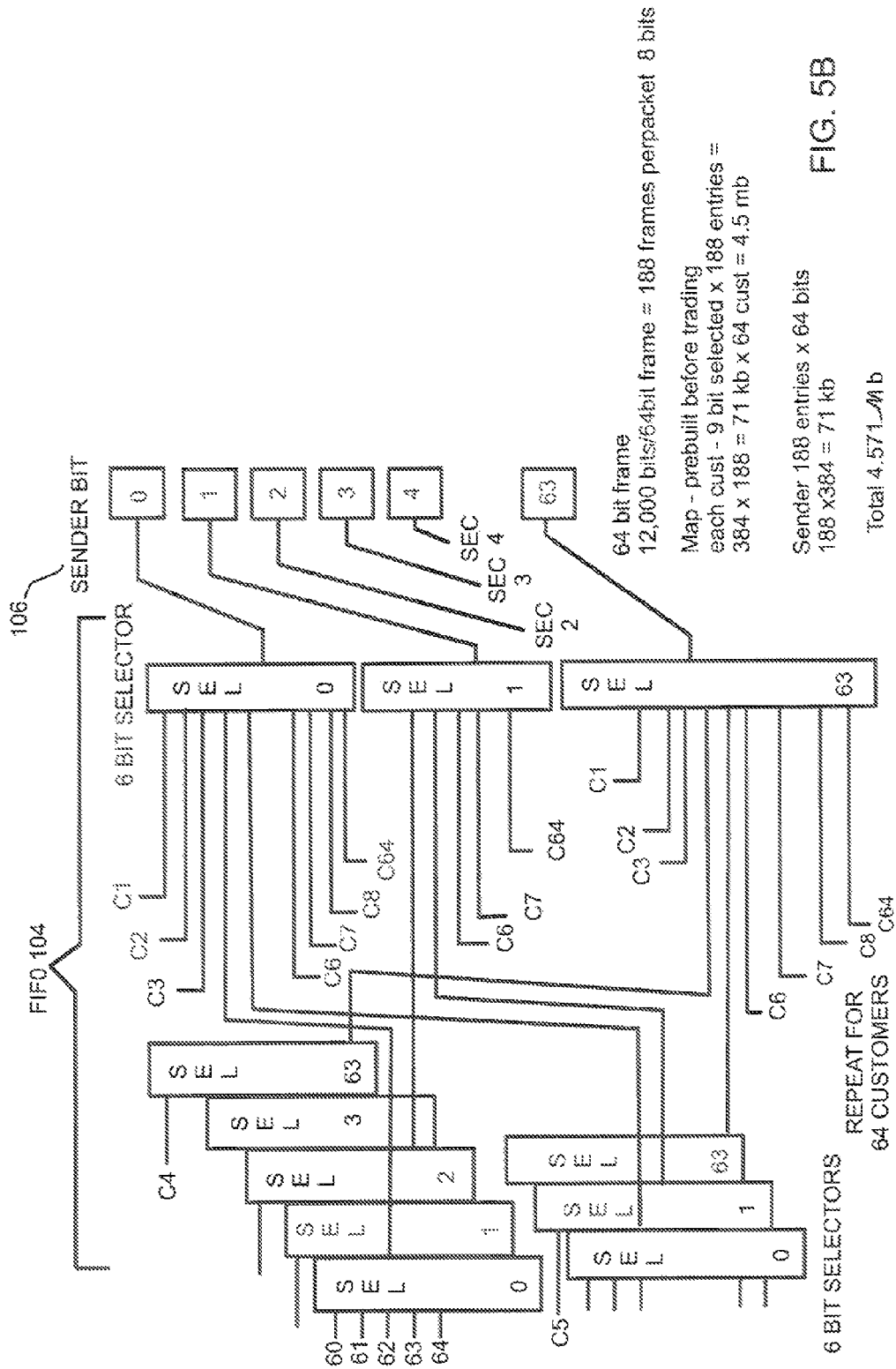
FIG. 5B depicts a schematic view of an embodiment of an alternate FIFO register of the present invention with respect to FIG. 4B.

With respect to FIG. 4A, 5B; an alternate embodiment of the invention operates in the following way, while constructing packets quickly enough to maintain a completely full wireless trunk network backbone 30, 32 (FIG. 1). At step 410 (FIG. 4B) a sender 105 has a 187×64 bit frame located at sender 106 (FIG. 3, 5B). At step 420 (FIG. 5B) the sender map uses 64 selectors of the FIFO 104 (FIG. 5B) to select which customer ports will fill in each sender bit. There is selector for each customer ports in the FIFO 104 (FIG. 3) to fill each sender bit 106. At step 430, the data bits received from customer ports (C1-C64) are transmitted to 64 selectors that take empty bits to fill with each customer ports payload. This repetition of loop 465 starting again at step 420 will continue until a custom 1,520 byte or larger packet is ready for a point-to-point transmission at step 470 from the sender 106 (FIG. 3, 5B).

Figure 4C:
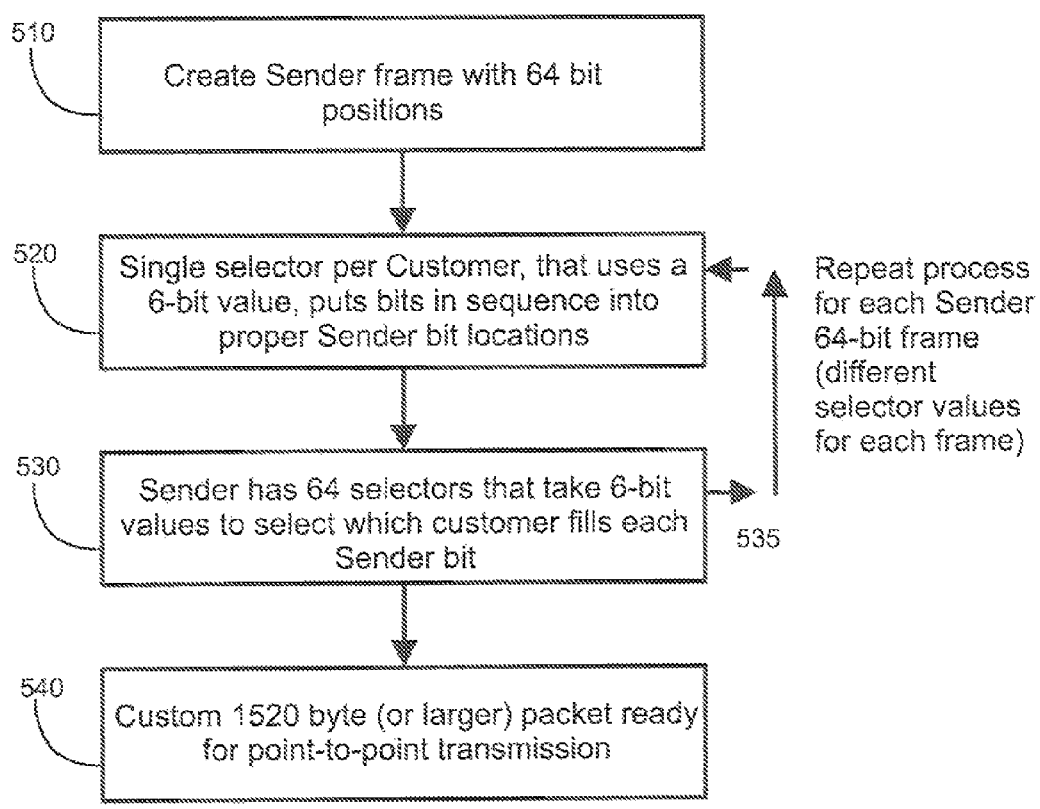
FIG. 4C depicts a flowing diagram outlining the operation of an alternate embodiment of the present invention using 6-bit valves and a 64 bit frame and a single selector per customer ports.

In an alternate embodiment, packet sharing will be described with respect to FIG. 4C. At step 510 the sender 106 (FIG. 3, 5B) creates a frame with 64 possible byte positions. At step 520, a single selector per customer ports that uses a 6 bit value puts bits in sequence into proper sender bit locations. At step 530, the sender 106 has 64 selectors that take 6 bit values to select and customer ports fills each sender bit. These steps 520, 530 are repeated for each sender 64 bit frame at step 535 to provide different selector values for each frame until a custom 1,520 byte or larger packet is ready for point-to-point transmission at step 540 from the sender 106 (FIG. 3, 5). As well, the customer ports data may be encrypted by combining all customer ports bits using the XOR scrambler bits, the pro rata share for all customers, the method used to spread customer ports data within trunk frames and the map which divides up customer ports bits by time slice as shown in the code below.

```
// One sender instance that gets bits from all customers.
while( request_for_trunk_bits ) begin
   if( trunk_bits < 1232 ) begin
      trunk_bits <= bits_from_cust1 && bits_from_cust2 && ... && bits_from_custN; //
Get bits from each customer ports.
      truck_bits <= trunk_bits XOR scrambler_mask; // XOR LUT
      Trunk    <= trunk_bits;
      crc_value <= CRC( trunk_bits, crc_value ); // Keep a running total of the CRC.
   end
   else begin
      Trunk    <= crc_value && frame_count;
      crc_value <= 0;            // Reset the CRC.
      trunk_bits <= 0;           // Reset the Trunk bit count.
      frame_count <= frame_count + 1;        //Increment the frame count.
   end
end
```

This packet sharing process also provides for encryption in and of itself. Such a process can be also combined with an encryption map, such as by Exclusive-Or Look Up Table (XOR'g) the bits with a changing pattern know to both the transmitting and receiving ends but not communicated across the wireless link. The encryption step may occur at the FIFO 104 or sender 106 (FIG. 3, 5C).

The packet sharing systems is also illustrated with respect to FIGS. 5 and 6. For example, referring to FIG. 6, each customer ports may have 188 entries times 7 bit starting value and 256 entries at 8 bits equal 2 Kb. So with 4 customers equals 128 Kb. If the sender has 188 entries for 6 bit customer ports at 64 bits each and 188 entries times 384 times equals 71 Kb for a total of 199 Kb. Such an approach can help to manage multiple customer ports each with different levels of subscribed bandwidth, such that wireless packets can be sent using configurable logic blocks (CLB) to craft each bit of wireless data all based on customer port bandwidth allocation. Under such a method latency is reduced during traffic periods when more than one customer ports is transmitting across the network. Latency can be tested by using loop-back testing at the PCS 70 and PMA 72 (FIG. 2) to determine round trip time on nanoseconds.

The above described functionality may be implemented in any point-to-point or serial transmission type system. Numerous variations and modifications will become apparent to those skilled in the art once the above disclosure is fully appreciated. It is intended that the claims be interpreted to embrace all such variations and modifications.

The invention claimed is:

1. A method of combining and transmitting data fragments for multiple customer ports $C_1$ to $C_n$ sent over a first packet-switched computer network to a trunk network and redistributed over a second packet-switched computer network, each customer port having a preselected bandwidth designation, the method comprising the steps of:

providing a First-In First-Out (FIFO) register to capture incoming data bits from each customer port in parallel and speeds equal to or greater than 1 Gbps;

providing selectors connected to the FIFO outputs, each selector capable of mapping individual incoming data bits from different customer ports and combining them into the same trunk fragments where the number of bits in each trunk frame is a pro rata share of the bandwidth designated to each customer port $C_1$ to $C_n$, that equals a percentage of total subscribed bandwidth divided 1,232 bits or greater;

filling each trunk fragment with data bits from customer ports $C_1$ to $C_n$, by selector values for each customer port;

repeating the filling sequence for each fragment until sufficient trunk fragments form a filled trunk frame;

sending each filled trunk frame across the trunk network having a transmission rate that is less than the sum of all customer port incoming bandwidths but equal to the sum of the trunk bandwidth allocation for all customer ports; and transmitting the filled trunk frames from the first incoming packet-switched computer network, through the trunk network to the second packet-switched computer network and transmitted to an intended receiving network endpoint.

2. The method of claim 1 wherein there are at least 2 customers and up to 64 customers connected to the first packet switched computer network.

3. The method of claim 1, further comprising the step of filling of 16-bit trunk fragments using 4-bit selectors to select each customer ports' data bit.

4. The method of claim 1, further comprising the step of providing selectors that receive data bits from every customer port on the first incoming packet-switched computer network as soon as the first data bits arrive without waiting for a complete data packet from any customer port.

5. The method of claim 1, further comprising the step of scrambling a 16 bit trunk fragment using a 16 bit Exclusive-Or (XOR) Look Up Table (LUT) comprised of 16 to 1,232 scrambling data bits to create a scrambled trunk fragment.

6. The method of claim 5, further comprising the step of adding a trunk frame CRC of 12-bits to the filled trunk frame, adding a trunk frame 4-bit count to the filled trunk frame and resetting the selectors, and the XOR LUT beginning the next trunk frame with no break or idle section between filled trunk frames.

7. The method of claim 5, further comprising the step of encrypting customer port data by combining all customer port bits using the XOR scrambler bits according to the pro rata share for all customers, the method used to spread customer port data within trunk frames and the map which divides up customer ports bits by timeslice, sending trunk fragments that are scrambled by the XOR LUT, but not scrambled by a self-organizing scrambling polynomial, and providing a receiver with an XOR LUT to descramble and break up the trunk fragments into data bits for each trunk frame.

8. The method of claim 1, further comprising the step of receiving the trunk fragments at the receiving network end point of the second packet-switched computer network.

9. The method of claim 1, further comprising the step of sending 1,232 data bits per 1,248 total bits (equivalent to 154/156 encoding) with no further encoding or loss of bandwidth.

10. The method of claim 1, further comprising the step of providing each customer port with a FIFO register, each customer port assigned the FIFO register for holding partially received customer data packets, providing selectors that match customer port data bits with the corresponding customer port assigned FIFO register, receiving data fragments by the customer port assigned FIFO register and locating an end-of-frame block type field and the end-of-frame is designated as an idle block type field.

11. The method of claim 1, further comprising the step of transmitting the filled trunk frame as soon as enough data arrives to allow the continuous sending of all customer ports' packets, each customer ports' pro rata share of bandwidth equals the percentage of total subscribed bandwidth divided by 1,232 bits and the selector uses 3, 4, 5 or 6 bit indexes to assemble 8 bit, 16 bit, 32 bit or 64 bit values to fill each trunk frame.

12. The method of claim 1, wherein the completed packet is between 1,232 bits and 1,520 bytes.

13. The method of claim 1, wherein each customer port has data bits in every trunk frame and the customer ports' bits are spread out within every trunk frame so as to prevent waiting when multiple customers send a number of packets all at the same time.

14. The method of claim 1, wherein the trunk network throughput is at least 199 Kb.

15. The method of claim 1, wherein packets are sent using configurable logic blocks (CLB) and wherein the CLB is a layer 1+ field-programmable gate array (FPGA) or application specific integrated circuit (ASIC), the first packet switched computer network providing a relay for point to point wireless, Infiniband or Ethernet transmissions.

16. The method of claim 1, wherein latency is below 1 microsecond round-trip, assuming a trunk transmission speed of at least 10 Mbps.

17. The method of claim 1, further comprising the step of, at an intended receiving network endpoint, generating a reception map on the basis of previously allocated time slots from other transmitting network endpoints and the reception map comprises a bitmap, wherein each data bit corresponds to one of a plurality of timeslots, each data bit indicating whether that corresponding timeslot has previously been allocated.

18. The method of claim 1, further comprising the step of periodically synchronizing, as between the transmitting network endpoint and the receiving network endpoint, a time period on which a proposed transmission map is used and without synchronization among network resources and wherein the synchronizing step comprises the step of using a connection over which a synchronization signal is transmitted, separate and apart from any network connection and the synchronizing step comprises the step of transmitting synchronization packets over the network.

19. A relay for receiving Internet Protocol (IP), Infiniband or Ethernet packets for multiple customers $C_1$ to $C_n$ over a packet-switched computer network, comprising:

a First-In First-Out (FIFO) register having sixteen, four bit selectors;

the selectors connected to the FIFO outputs, the selectors providing a filling sequence by mapping individual incoming bits from different customers ports and combining bits into the same output 16 bit trunk fragments in order to create trunk fragments where the number of bits indexed in each trunk frame for each customer port is a pro rata share of bandwidth designated to each customer port $C_1$ to $C_n$; that equals a percentage of total subscribed bandwidth divided by 1,232 bits or greater;

repeating the filling sequence for each 16 bit trunk fragment until sufficient trunk fragments form a filled trunk frame having at least 1,232 customer port bits plus 16 bits of cyclic redundancy check (CRC) and a frame count; and a sender for transmitting each filled trunk frame across a trunk network at a transmission rate that is less than a combination of all customer port incoming bandwidths from a first incoming packet-switched computer network but equal to the sum of the trunk bandwidth allocation for all customer ports.

20. The relay of claim 19, wherein only idle frames are sent before and after customer port packets to distinguish between customer port data and idle frames in order to provide layer 1+ transmission, as all possible packets of all formats may be sent and are surrounded by idle frames.

21. The relay of claim 19, wherein the filled trunk fragment is 16 bits or smaller and each selector capable of mapping for only one customer.

22. The relay of claim 19, wherein each customer port $C_1$ to $C_n$, transmits bits received in every filled trunk frame.

23. The relay of claim 19, wherein all customer packets are forwarded by the sender to the correct destination based on the relay port from which it was received.

24. The relay of claim 19, wherein all network administration, routing, discovery, query, reply, broadcast, unicast and multicast packets are forwarded by the sender to the destination port on the second packet-switching network without changing the configuration or routing of the relay device and without sending those packets anywhere except the destination port for the sending customer ports.

25. A low latency logic device comprising:

a First-In First-Out (FIFO) register to capture incoming data packets from each customer port in parallel and speeds equal to or greater than 1 Gbps;

selectors connected to the FIFO outputs, each selector capable of mapping individual incoming bits from different customer ports and combining the bits into the same output trunk fragments in order to create trunk fragments where the number of bits indexed in each trunk frame for each customer port is a pro rata share of bandwidth designated to each customer $C_1$ to $C_n$; that equals a percentage of total subscribed bandwidth divide by 1,232bits or greater;

the selectors filling each trunk fragment with bits from customer ports $C_1$ to $C_n$, by selector values for each customer port;

the selectors repeating the filling sequence for each fragment until sufficient trunk fragments form a filled trunk frame; and a sender for transmitting each filled trunk frame across a trunk network at a transmission rate that is less than a combination of all customer port incoming bandwidths from a first incoming packet-switched computer network but equal to the sum of the trunk bandwidth allocation for all customer ports.

26. The logic device of claim 25, wherein there are between 2 and 64 customer ports per logic device and 16 to 64, 4 bit selectors to fill each trunk fragment.

27. The logic device of claim 25, the first packet-switched computer network linked to the trunk network, linked to a second packet-switched computer network and an Exclusive-Or (XOR) Look Up Table (LUT) compromised of 16 of 1232 scrambling bits to crate scrambled trunk fragments for filling the trunk frame and the filled and scrambled trunk frame received by the second packet-switched computer network and being unscrambled by the XOR LUT.

28. The logic device of claim 25, having selectors that receive data bits from every customer port as soon as the first bits arrive without waiting for a complete packet from any customer port.

29. The logic device of claim 25, wherein packets are sent using configurable logic blocks (CLB) converted into dedicated logic blocks and the CLB is a layer 1+ field-programmable gate array (FPGA) or application specific integrated circuit (ASIC) of the logic device.

30. The logic device of claim 25, wherein the logic device latency is below 1 microsecond round-trip, the latency measured through all utilized CLBs and eight network ports including: customer ports port-in first network, trunk port-out, trunk port-in, customer ports port-out second network and then back, customer ports port-in second network, trunk port-out, trunk port-in, customer ports port-out first network and the CLB is a layer 1+ field-programmable gate array (FPGA) or application specific integrated circuit (ASIC) of a logic device device of claim 1 for point-to-point wireless, Infiniband or Ethernet transmissions.

\* \* \* \* \*